(12) United States Patent
Chandran

(10) Patent No.: US 7,531,014 B2
(45) Date of Patent: May 12, 2009

(54) FLUID BED REACTOR HAVING A PULSE COMBUSTOR-TYPE HEAT TRANSFER MODULE SEPARATED FROM THE COMPARTMENT OF A REACTION VESSEL

(75) Inventor: Ravi Chandran, Ellicott City, MD (US)

(73) Assignee: Thermochem Recovery International, Inc., Baltimore, MD (US)

( * ) Notice: Subject to any disclaimer, the term of this patent is extended or adjusted under 35 U.S.C. 154(b) by 262 days.

(21) Appl. No.: 11/429,917

(22) Filed: May 8, 2006

(65) Prior Publication Data

US 2007/0245629 A1 Oct. 25, 2007

Related U.S. Application Data

(63) Continuation of application No. 11/409,835, filed on Apr. 24, 2006, now abandoned.

(51) Int. Cl.
*B01J 7/00* (2006.01)
*B01J 8/18* (2006.01)
*H01M 8/06* (2006.01)
*C01B 3/36* (2006.01)
*C10J 3/46* (2006.01)
*C10J 3/54* (2006.01)
*F27B 15/00* (2006.01)
*F23C 15/00* (2006.01)
*F27D 7/00* (2006.01)

(52) U.S. Cl. .......................... 48/61; 48/197 R; 422/139; 431/1; 432/25

(58) Field of Classification Search .............. 48/61, 48/197 R; 431/1; 126/116 R; 432/25
See application file for complete search history.

(56) References Cited

U.S. PATENT DOCUMENTS 2,800,307 A * 7/1957 Putney ................... 165/108

(Continued)

OTHER PUBLICATIONS

International Search Report No. PCT/US2007/067095, dated Jul. 1, 2008.

(Continued)

*Primary Examiner*—Alexa D Neckel
*Assistant Examiner*—Matthew J Merkling
(74) *Attorney, Agent, or Firm*—Womble Carlyle

(57) ABSTRACT

A fluid bed reactor is configured to process a reactive material to form one or more products. The reactor includes a reaction vessel defining a compartment configured to receive the reactive material. Attached to the reaction vessel is at least one heat transfer module. Each heat transfer module includes a pulse combustor and an associated acoustic chamber. The pulse combustor has at least one tailpipe that terminates in its associated acoustic chamber. Flue gases exiting the tailpipe(s) pass from the acoustic chamber, through a wall separating the acoustic chamber from the reactor vessel and into heat transfer tubes that protrude into a compartment of the reactor vessel. Feedstock inlets are configured to introduce the reactive material into a region that is vertically between the first and second clusters of heat transfer tubes. The heat transfer tubes have an annular construction such that the flue gases pass through an inner shield tube in a direction away from the wall, turn around, and return in a direction towards the wall. The gases are then directed to a manifold from which they ultimately exit the device. Cooling by water or another heat transfer fluid may be provided to the tubes to facilitate integrity of the materials and joints of construction. The reactor may be controlled such that the fluid bed selectively is operated either in the bubbling bed regime or in the turbulent fluidization regime.

25 Claims, 8 Drawing Sheets

U.S. PATENT DOCUMENTS

| | | |
|---|---|---|
| 4,688,521 A | 8/1987 | Korenberg |
| 5,059,404 A | 10/1991 | Mansour et al. |
| 5,064,444 A | 11/1991 | Kubiak et al. |
| 5,133,297 A | 7/1992 | Mansour |
| 5,197,399 A | 3/1993 | Mansour |
| 5,205,728 A | 4/1993 | Mansour |
| 5,211,704 A | 5/1993 | Mansour |
| 5,255,634 A | 10/1993 | Mansour |
| 5,306,481 A | 4/1994 | Mansour et al. |
| 5,353,721 A | 10/1994 | Mansour et al. |
| 5,366,371 A | 11/1994 | Mansour et al. |
| 5,536,488 A | 7/1996 | Mansour et al. |
| 5,637,192 A | 6/1997 | Mansour et al. |
| 5,638,609 A | 6/1997 | Chandran et al. |
| 5,842,289 A | 12/1998 | Chandran et al. |
| 6,149,765 A | 11/2000 | Mansour et al. |
| 6,149,768 A | 11/2000 | Nosshi et al. |
| 6,548,197 B1 | 4/2003 | Chandran et al. |
| 6,832,565 B2 | 12/2004 | Chandran et al. |
| 6,923,004 B2 | 8/2005 | Chandran et al. |
| 6,958,136 B2 | 10/2005 | Chandran et al. |
| 6,997,118 B2 | 2/2006 | Chandran et al. |

OTHER PUBLICATIONS

Written Opinion of the International Searching Authority, mailed Aug. 6, 2008, 6 pgs.

International Preliminary Report on Patentability from PCT/US2007/67095, issued Oct. 28, 2008.

* cited by examiner

US 7,531,014 B2

FLUID BED REACTOR HAVING A PULSE COMBUSTOR-TYPE HEAT TRANSFER MODULE SEPARATED FROM THE COMPARTMENT OF A REACTION VESSEL

RELATED APPLICATIONS

This is a Continuation of U.S. patent application Ser. No. 11/409,835, filed Apr. 24, 2006, whose contents are incorporated by reference in their entirety.

FIELD OF THE INVENTION

The present invention relates to a fluid bed reactor for processing a reactive material, which may include inorganic materials, and also carbonaceous materials, such as black liquor and biomass, to process and/or recycle materials and extract energy. More particularly, it concerns such a device having one or more pulse combustors whose resonance tubes do not protrude in the compartment of the reaction vessel.

BACKGROUND OF THE INVENTION

FIGS. 1A and 1B show top and side views, respectively, of a prior art reactor, configured as a cylindrical reformer 100. The cylindrical reformer 100 includes a cylindrical compartment 101 forming a reaction vessel. The reformer 100 comprises one or more pulse heaters 102A, 102B, each of which comprises a pulse combustor 104A, 104B connected to a respective resonance tube 106A, 106B. As seen in FIG. 1A, the pulse heaters 102A, 102B extend in one direction across the diameter of the cylinder. Air and fuel products enter the pulse combustors 104A, 104B and the combustion products or flue gas exit the resonance tubes 106A, 106B.

The pulse heaters 102A, 102B are of the sort disclosed in U.S. Pat. No. 5,059,404, whose contents are incorporated by reference to the extent necessary to understand the present invention. Such pulse heaters are configured to indirectly heat fluids and solids introduced into a reformer reaction vessel 101. The resonance tubes 106A, 106B associated with the pulse heaters 102A, 102B serve as heating conduits for indirectly heating contents of the compartment 101.

As seen in FIGS. 1A and 1B, a second pair of pulse heaters 108A, 108B are directed at right angles to the first pair of pulse heaters 102A, 102B across the diameter of the compartment. As seen in FIG. 1B, this leaves vertically extending quadrants 136 within the compartment 101 in regions defined by the crossing pulse heaters.

The pulse heaters are immersed in a dense fluid bed 110, which extends from the compartment bottom 112 to approximately the top bed line 114. The bottommost pulse heater 102B is located at a height H1 meters above the distributor 122 to avoid painting the resonance tubes 104B with liquor 118. In some prior art systems, the height H1 is about 2-3 meters.

Spent liquor 118 is injected into the side of the compartment 101 near the bottom of the dense fluid bed 110. Generally speaking, the spent liquor is introduced into the compartment via a plurality of inlets 103 that are circumferentially arranged around the cylindrical compartment 101. Though in FIG. 1B, only four such inlets 103 are shown, it is understood that other numbers of circumferentially arranged inlets may be provided. In other prior art embodiments, the spent liquor may be introduced through the bottom of the compartment 101 through a plurality of inlets more or less evenly distributed across the bottom, perhaps arranged in an array or other pattern.

Superheated steam 120, or other fluidization medium, enters from the bottom of the compartment 101 and passes through a distributor 122. The distributor 122 helps uniformly spread the entering steam 120, which then percolates through the dense fluid bed 110. Product gas 124 leaves from a freeboard area 126 at the top of the compartment 101 after passing through one or more internal cyclones (not shown) used to help drop out entrained bed solids.

FIGS. 2A and 2B show an alternative prior art configuration in the form of a rectangular reformer 200. The rectangular reformer 200 has a compartment 201 with a rectangular cross-section as seen from above (See FIG. 2B). A plurality of pulse heaters 102 arranged in one or more rows pass through this compartment 201. The rows are staggered relative to each other to enhance heat transfer. Each of these pulse heaters 102 comprises a heating conduit in the form of a resonance tube for indirectly heating the contents of the compartment 201.

A distributor 222 is provided at the bottom of the compartment 201, much like in the cylindrical reformer 100. The bottommost pulse heaters 202 are located at a height H2 above the distributor 222. In some prior art systems, this height H2 is again about 2-3 meters. Moreover, just as in the case with the cylindrical reformer, spent liquor 218 is introduced into the side of the compartment 201 near its bottom. Generally speaking, the spent liquor is introduced into the compartment via a plurality of inlets 203 that are arranged along the walls around the rectangular compartment 201. In other prior art embodiments, the spent liquor may be introduced through the bottom of the compartment 201 through a plurality of inlets more or less evenly distributed across the bottom, perhaps arranged in an array or other pattern. Meanwhile, product gas 224 leaves from a freeboard area 226 at the top of the compartment 201. It is understood that the operation of the rectangular reformer 200 is similar to that of the cylindrical reformer 100 described above, in most material respects.

The above arrangements appear to work satisfactorily in small process development scale units. However, they can encounter certain limitations when they are scaled up to larger units.

One issue is the presence of open quadrants (see FIG. 1B) where there are no tubes, or there is free space between pulse heaters bundles (See FIG. 2B), both of which may encourage steam/gas channeling and steam/gas bypassing, thus impairing gas-solid contact and solid circulation rate. Furthermore, the presence of such large vertical channels promotes the formation of large gas bubbles, which, by virtue of rapid increase in size and speed, may damage pipes, tubes, connections and other fixtures within the reformer.

Another issue is that a reduced solids circulation rate leads to longer particle contact times on the resonance tube surface. This hampers particle convection and, in turn, the heat transfer from the tubes. Consequently, the tubes tend to run hotter and this adversely affects the rate at which heat is dumped into the bed and increases the combustion flue gas exit temperature from the pulse heaters 102A, 102B, 202. Additionally, there is a greater propensity for local hot spots, which may lead to smelt formation and/or particle agglomeration and fouling or buildup around a few or many tubes.

Yet another limitation may be that the close coupling of the combustion chamber with the resonance tubes makes it necessary to minimize tube-to-tube spacing, or pitch, and, in turn, the gap between the resonance tubes. This is done to facilitate a reasonable aspect ratio (length to diameter) for the combustion chamber. And since the pulse heater is typically designed as a Helmholtz resonator, it must preserve certain geometric proportions (resonance tube length, resonance tube volume and combustion chamber volume). Experimental data and models for fluidized bed-tube heat transfer indicate significant improvement in heat transfer coefficient with an increase in the pitch or gap between tubes in a tube bundle. This is due to reduced resistance for solids movement with increasing space between tubes, which promotes more frequent surface renewal or particle convection and, in turn, greater heat transfer coefficient. However, the arrangements seen in FIG. 1B limits the gap between tubes to a value that is much lower than optimum from fluid bed heat transfer and operability standpoints.

Furthermore, a majority of combustion and heat release occurs in the pulse combustion chamber. However, combustion continues in the resonance tube albeit at a lower rate due to the lower temperature of the gases in the resonance tube. Residual combustion and heat release in the resonance tube is desirable from a heat transfer standpoint, but unsatisfactory if the combustion is incomplete and gives rise to significant concentrations of CO and unburned hydrocarbons in the exhaust flue gas. The probability of this outcome increases as the fuel-firing rate in the combustor decreases from the design-firing rate.

In addition, upon injection into the fluid bed, the carbonaceous feedstock undergoes drying, devolatilization, char formation and char conversion. In a steam reforming environment, all of these processes are endothermic i.e. require heat input. The greater the bed solids circulation rate and the more uniform the distribution of the feedstock across the bed, the faster the heating rate and the higher the final temperature of the feedstock. This enhances thermal decomposition of organic matter, leads to higher volatile yield and lower tar formation, and char yield. With a fluid bed-pulse heater configuration that encourages gas/steam channeling and bypassing, the solids circulation rate is hampered. This impedes heat transport to the feedstock injection zone, depresses temperature in this zone and promotes tar and char formation.

Yet another issue is that drying, devolatilization, char formation and char conversion processes all compete for heat transfer and mass transfer in the region that is above the distributor but below the bottom pulse heater. All these processes are heat sinks and the entering fluidization medium may be another heat sink if it is steam and is at a temperature below that of the fluid bed. The only heat sources are the pulse heaters and these are significantly removed from the heat sinks by the aforementioned distances H1 and H2 in the prior art embodiments described above. The only link is the solids circulation rate and if this is not up to par, the feedstock injection region starves for heat and the reactor performance suffers.

In addition, both heat transfer and mass transfer are important for satisfactory char conversion. The higher the char temperature and the reactant or steam concentration, the greater the char conversion rate. The region just above the distributor is characterized by high steam or reactant concentration, which is favorable for char conversion, provided the char temperature could be maintained at the fluid bed temperature. Due to feedstock injection and reduced solids circulation rate, the heat supply is limited which is likely to depress the char temperature and in turn the char conversion rate. In the region of the pulse heaters, the heat transfer is good but the mass transfer may be unsatisfactory if the reactant (steam) bypasses due to channeling, again impairing char conversion.

Commercial units generally require deep or tall dense fluidized beds to accommodate the large number of heat transfer tubes. Operating these units in bubbling fluidization regime is rather limiting from heat and mass transfer and gas/solid contact standpoints due to the relatively large bubbles, increased bubble coalescence and the propensity for steam/gas bypassing. Conversely, operation in the turbulent fluidization regime affords good gas/solid contact and excellent heat and mass transfer characteristics. This, however, requires a significantly higher superficial fluidization velocity than that for the bubbling regime. One feasible approach is to select a different heat exchanger configuration and a smaller bed material mean particle size.

In summary, the above-described prior-art configurations afford modularity and are beneficial for certain classes of size or feedstock capacity. However this approach becomes unwieldy for large scale or high feedstock throughput units due to the large number of pulse heaters required, the complexity of interconnections, piping, ducting, etc. and the cost. All of this constrains scale-up.

SUMMARY OF THE INVENTION

In one aspect, the present invention is directed to a fluid bed reformer configured to convert a carbonaceous material into a product gas. The fluid bed reformer includes a reaction vessel defining a compartment configured to receive fluidizable carbonaceous material, the reaction vessel having at least a first wall portion and a second wall portion. A first heat transfer module is connected to the reaction vessel, the first heat transfer module comprising a first pulse combustor connected to a first acoustic chamber, wherein the first pulse combustor comprises at least one first tailpipe that terminates in the first acoustic chamber. A first plurality of heat transfer tubes protrude into said compartment, each of said first plurality of heat transfer tubes being in fluid communication with the acoustic chamber through said first wall portion. Each of the first plurality of heat transfer tubes is configured such that combustion products emitted from the at least one first tailpipe travel along a first channel of each heat transfer tube in a direction away from said first wall portion, and then along a second channel of said each heat transfer tube in a direction towards the first wall portion.

Multiple such heat transfer modules may be connected to the reaction vessel.

In another aspect, the present invention is directed to a fluid bed reactor configured to thermochemically or biochemically process a reactive material. The reactor includes a reaction vessel defining a compartment suitable for receiving a reactive material. A plurality of heat transfer modules are connected to the reaction vessel, each heat transfer module comprising a pulse combustor connected to an associated acoustic chamber, wherein each pulse combustor comprises at least one tailpipe that terminates in the associated acoustic chamber. A plurality of upper and lower heat transfer tubes protrude into the compartment, each of the plurality of upper and lower heat transfer tubes being in fluid communication with the associated acoustic chamber through a reformer wall portion of reaction vessel. Each of the plurality of upper and lower heat transfer tubes is configured such that combustion products emitted from the at least one tailpipe travel along a first channel of each heat transfer tube in a direction away from the reformer wall portion of the reaction vessel, and then along a second channel of said each heat transfer tube in a direction towards the reformer wall portion.

BRIEF DESCRIPTION OF THE DRAWINGS

For a better understanding of the present invention and to show how the same may be carried out in practice, reference will now be made to the accompanying drawings, in which.

DETAILED DESCRIPTION OF PREFERRED EMBODIMENTS

The contents of U.S. Pat. Nos. 5,059,404; 5,306,481; 5,353,721; 5,536,488; 5,637,192 and 6,149,765 are incorporated by reference to the extent necessary to understand the present invention.

Figure 1A:
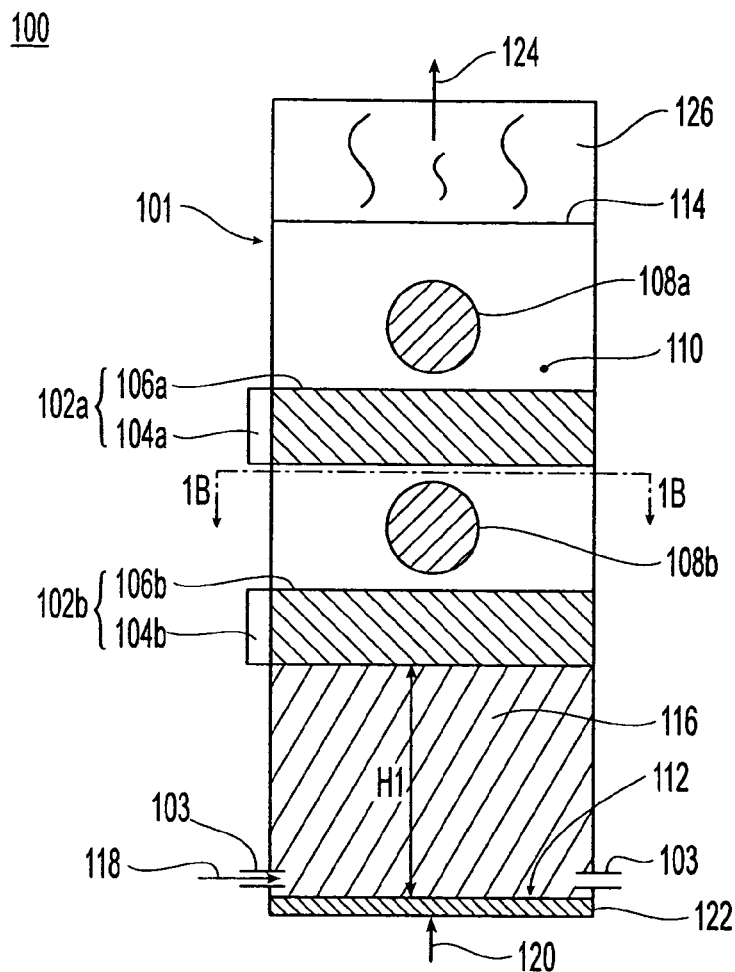
FIGS. 1A and 1B show side and top views, respectively, of a prior art cylindrical reformer.
Figure 1B:
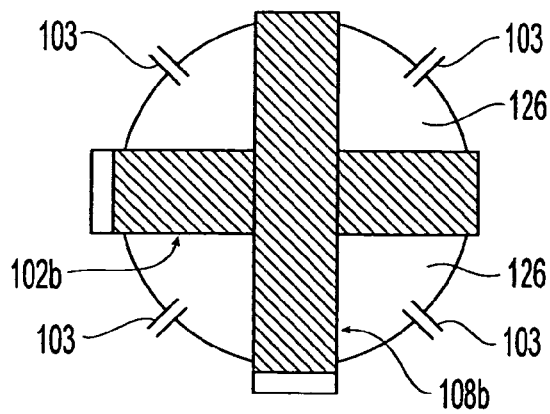
Figure 2A:
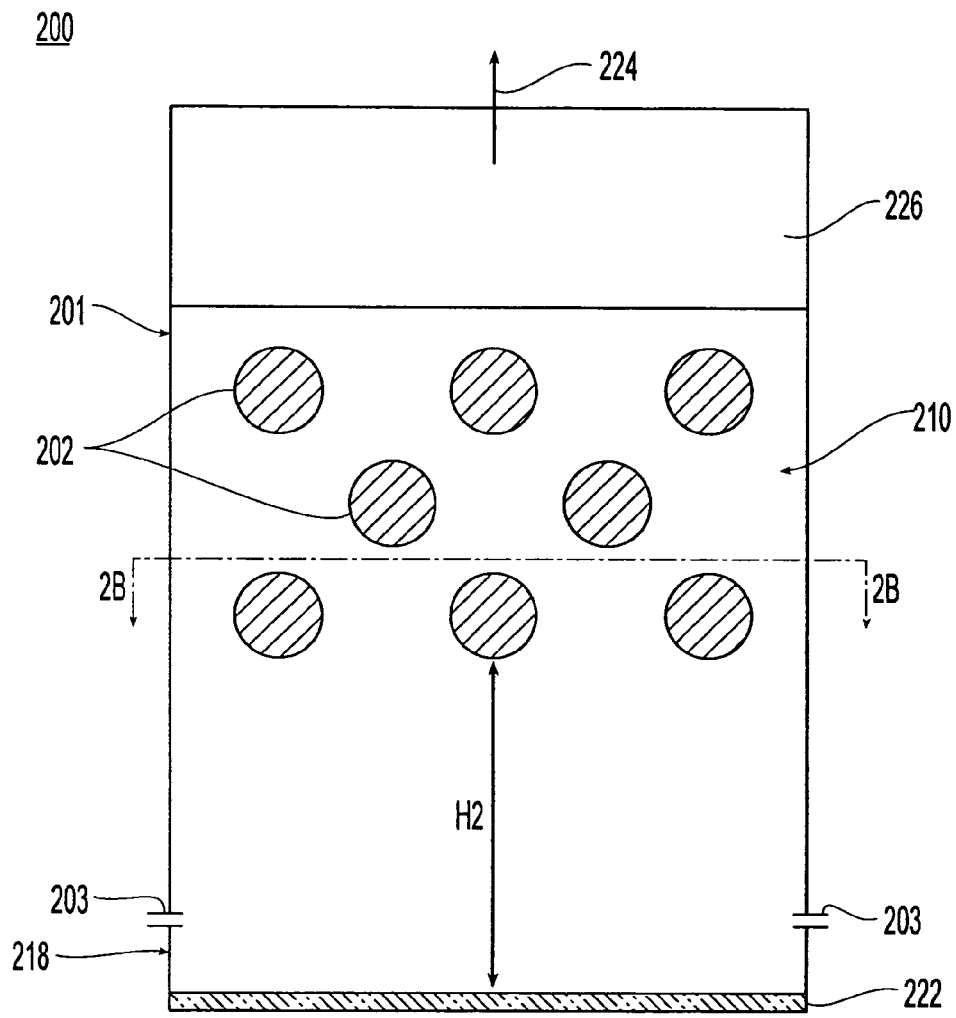
FIGS. 2A and 2B show side and top views, respectively, of a prior art rectangular reformer.
Figure 2B:
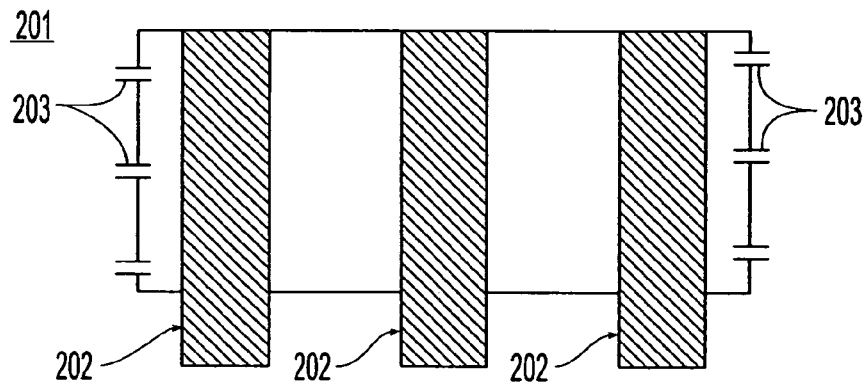
Figure 3A:
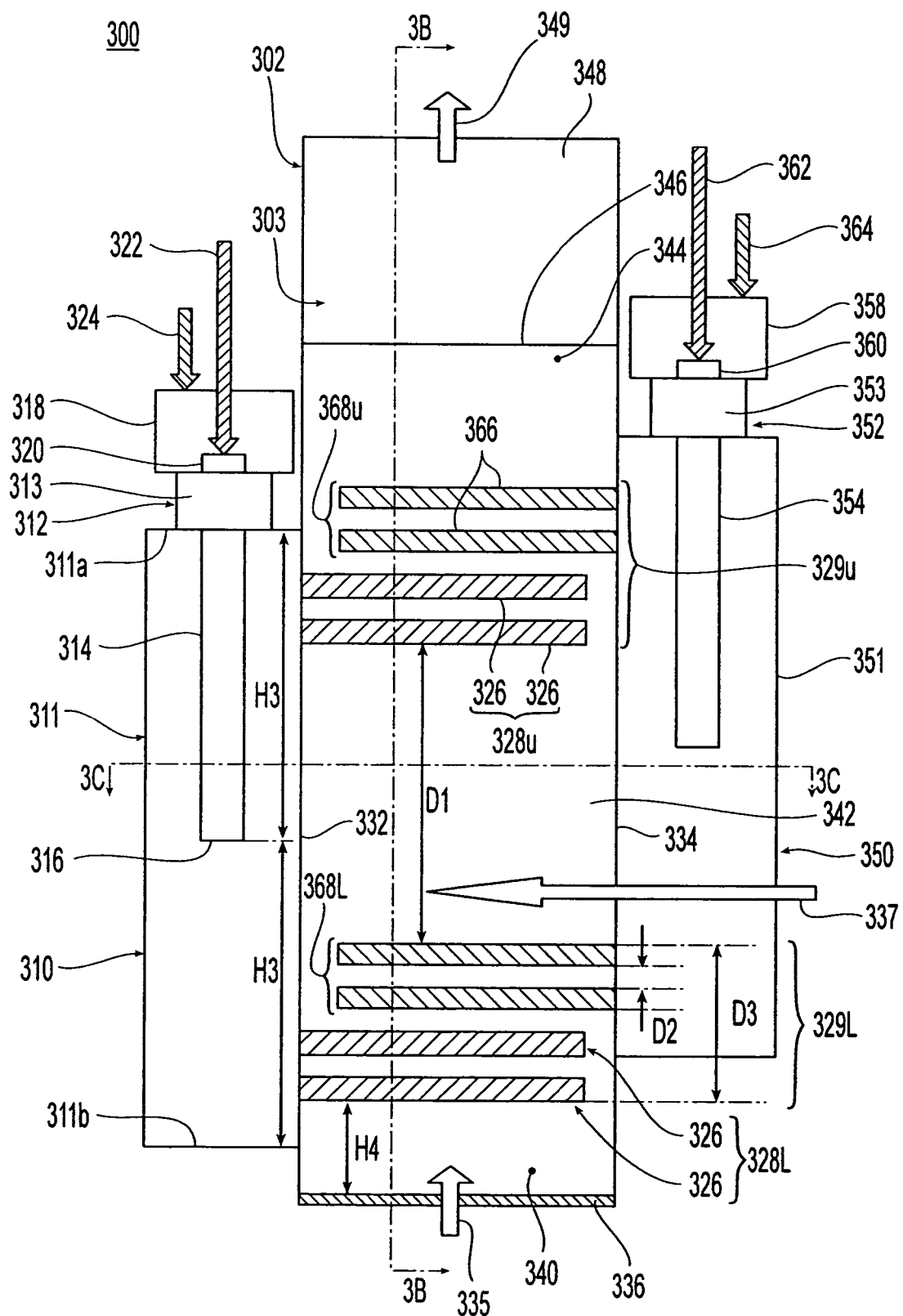
FIGS. 3A, 3B & 3C show side, side cutaway and top cutaway views, respectively, of a device in accordance with the present invention.

FIG. 3A shows a side view of a reactor 300 in accordance with the present invention. In the description that follows, the reactor is assumed to be a reformer 300. The reformer 300 comprises a reformer vessel 302 and a pair of heat transfer modules 310, 350, one on either side of the reformer vessel 302. The reformer vessel 302 defines a compartment 303 configured to receive a fluidizable carbonaceous material. As seen in FIG. 3A, two heat transfer modules are vertically offset relative to another. In the embodiment shown, the second heat transfer module 350 is at a slightly higher position than the first heat transfer module 310.

The first heat transfer module 310 includes a first acoustic chamber 311 and a first pulse combustor 312. The first pulse combustor 312 includes a pulse combustion chamber 313 connected to a tail pipe 314. As seen in the embodiment of FIG. 3, the pulse combustion chamber 313 is positioned atop the first acoustic chamber 311. Meanwhile, the tail pipe 314 is substantially entirely within the first acoustic chamber 311 and extends in a vertically downward direction therein. As also seen in this embodiment, the tailpipe exit 316 is positioned about half-way along the vertical extent of the acoustic chamber 311, which has a height of 2×H3. This allows for the first acoustic chamber 311 to resonate upon activation of the first pulse combustor 312 and result in a standing wave in the acoustic chamber.

Sitting atop the pulse combustion chamber 313 is an air plenum 318, which surrounds a valve 320. The valve may comprise a single valve, or may comprise a multiple valve 320. The valve 320 provides a gateway to the inlet of the pulse combustion chamber 313, and thus permits combustibles 322 such as fuel and/or product gas, and air 324, to enter the latter. The air 324 may enter the air plenum 318 and mix with the combustibles 322 proximate the exit of the valve 320 before being injected into the pulse combustion chamber 313.

The combustion products exiting the end 316 of the tail pipe 314 into the first acoustic chamber 311 pass through openings formed in a first wall 332 of the reformer vessel 302 and enter into a plurality of heat transfer tubes 326 connected to the first wall 332. The heat transfer tubes 326 belong to either a first upper heat transfer tube bundle 328U or a first lower heat transfer tube bundle 328L. The first upper and lower heat transfer tube bundles 328U, 328L protrude into the reformer vessel 302 where heat is imparted into the fluid therein.

Figure 3B:
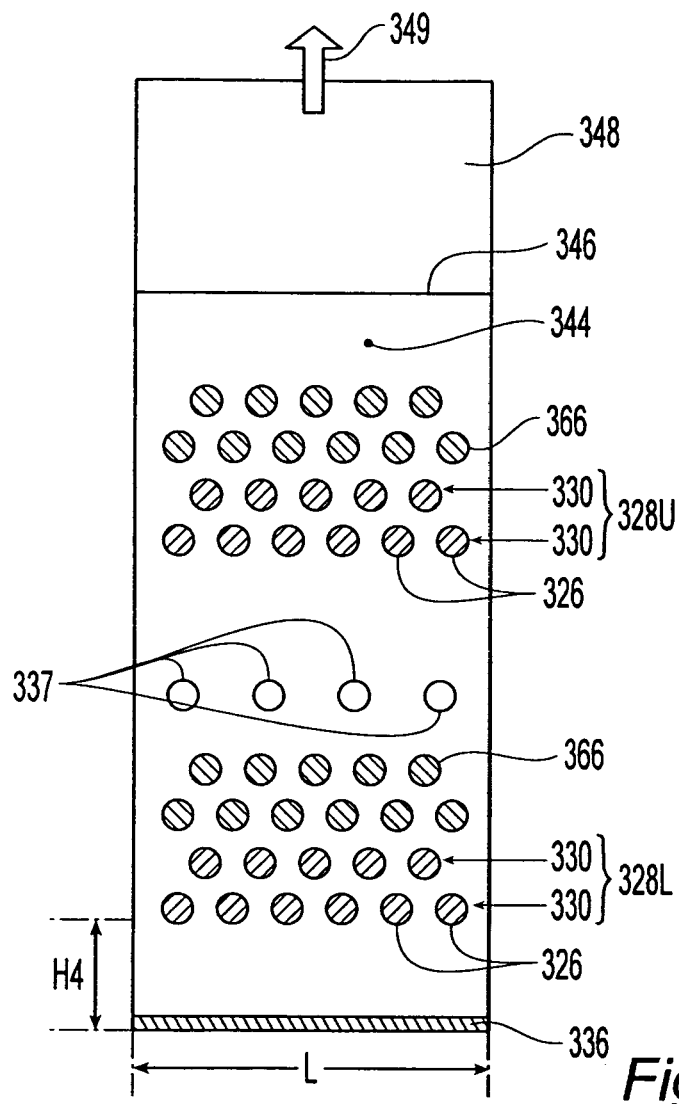

Each bundle 328U, 328L, 368U, 368L comprises a plurality of heat transfer tubes. As seen in FIG. 3B, each bundle 328U, 328L may comprise a plurality of rows 330 of tubes 326. The rows 330 belonging to a single bundle preferably are staggered, as shown in FIG. 3B, though they may simply be vertically aligned with each other. Each row 330 may comprise a plurality of tubes 326, the exact number being limited by the tube diameter, tube spacing and the length L of the vessel wall 332 to which the tubes 326 are connected.

The total number of rows and the total number of heat transfer tubes 326 can be modified in any given design to suit the size, feedstock type and feedstock throughput of the steam reformer. Once these parameters are known, the first pulse combustor 312 and the first acoustic chamber 311 can be designed to match the heat transfer duty. Since the number of rows and number of columns may be varied, a reformer such as reformer 300 may be scaled from small to large sizes. Regardless of the overall size, the heat transfer tubes 326 can be configured arranged within the reformer vessel 302 to help promote gas-solid contact and mitigate gas/steam channeling and bypassing.

In the reformer 300, the first pulse combustor 312 is thus physically separated from the heat transfer tubes 326, but functionally coupled via the first acoustic chamber 311. The first acoustic chamber 311 completely encloses the tailpipe 314, with the tailpipe exit 316 located near the geometric center of the acoustic chamber. With the first pulse combustor 312 designed as a Helmholtz and quarter wave resonator, the tailpipe exit 316 corresponds to a velocity anti-node, or pressure node. The first acoustic chamber 311 is configured to serve as a standing wave generator with pressure anti-nodes, or velocity nodes, at its ends 311A, 311B.

The two bundles of heat transfer tubes 328U, 328L are positioned such that the upper bundle 328U is near the pressure anti-node at the top 311A of the first acoustic chamber 311, while the lower bundle 328L is near the pressure anti-node at the bottom 311B of the first acoustic chamber 311. This facilitates efficient transfer of the acoustics from the first pulse combustor 312 to the heat transfer tubes 326 of the first upper and lower bundles 328U, 328L. It also provides for periodic boundary layer scrubbing and enhancement in heat transfer coefficient.

As seen in FIG. 3A, the upper bundles 328U, 368U constitute an upper bundle cluster 329U, while the lower bundles 328L, 368L constitute a lower bundle cluster 329L. The lowermost member of the upper bundle cluster 329U is spaced apart from the uppermost member of the lower bundle cluster 329L by an inter-cluster vertical spacing D1. The inter-cluster vertical spacing D1 substantially exceeds the inter-row vertical spacing D2, which is the spacing between rows within the bundles. In one embodiment, the ratio of the inter-cluster vertical spacing D1 to the inter-row vertical spacing D2, D1/D2, is greater than or equal to 2. In some embodiments, the inter-cluster vertical spacing D1 also exceeds the maximum cluster height D3 of either the upper bundle cluster 329U or the lower bundle cluster 329L, it being understood that the clusters are not required to have the same height, or the same number of rows. In one embodiment, the ratio of the inter-cluster vertical spacing D3 to the maximum cluster height D3, D1/D3, is greater than or equal to 2. The lower and upper clusters 329L and 329U are all immersed within the dense bed 342.

The second heat transfer module 350 includes a second acoustic chamber 351 and a second pulse combustor 352. The construction of the second pulse combustor 352 is similar to that of the first pulse combustor 312. The second pulse combustor 352 thus comprises a pulse combustion chamber 353 connected to a tail pipe 354. An air plenum 358 and valve 360 associated with the second pulse combustor 352 for the introduction of combustibles 362 and air 364 are also provided.

The combustion products exiting the tail pipe 354 into the second acoustic chamber 351 pass through openings formed in a second wall 334 of the reformer vessel 302 and enter into a plurality of heat transfer tubes 366 connected to the second wall 334. The heat transfer tubes 366, which preferably are of the same construction as heat transfer tubes 326, belong to either a second upper heat transfer tube bundle 368U or a second lower heat transfer tube bundle 368L.

The compartment 303 of the reformer vessel 302 includes a number of vertically spaced apart regions having different functional roles and in which various activities take place.

At the bottom of the reformer vessel 302 is a distributor 336 into which a fluidization medium 335, such as steam, is introduced. The bottommost heat transfer tube 326 is located closer to the distributor 336 to facilitate good communication between the heat source and the heat sink. In one embodiment, the spacing H4 (see FIG. 3B) between the distributor 336 and the bottom most heat transfer tube 326 is between 0.5-1.5 meters. However, other spacings are possible as well.

The region above the distributor 336 and below the top of the lower bundles 328L, 368L is termed the enhanced char conversion zone 340. The zone 340 provides for good heat and mass transfer and high reactant (steam) concentration and facilitates enhanced char conversion. The vertical extent of this zone will depend upon the char reactivity and the reformer operating conditions with the slower the reaction(s) the greater the vertical extent.

Figure 3C:
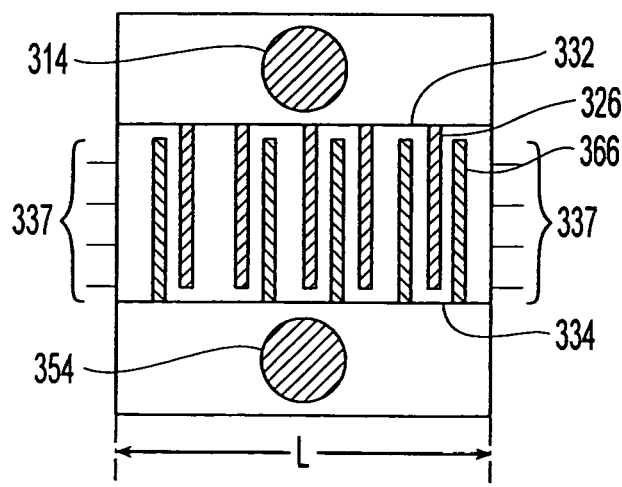

Between the lower bundles 328L, 368L and the upper bundles 328U, 368U is a drying and devolatilization zone 342 with height D1, as previously discussed. This zone is conducive to good solids circulation, heat transport and gas-solid contact, serves to maximize drying and devolatilization and minimizes tar and char formation. In one embodiment, a feedstock inlet, shown generally as arrow 337 terminates in a region vertically between the lower heat transfer bundles 328L, 368L and the upper heat transfer bundles 328U, 268U. Thus, in this embodiment, feedstock is injected into zone 342, which is separated from the primary char reaction zone 340, at a position vertically above the lower heat transfer bundles 328L, 368L and below the upper heat transfer bundles 328U, 268U. Although only a single feedstock inlet 337 is shown, it is understood that this feedstock inlet 337 is intended to represent a plurality of such inlets. This plurality of inlets are all approximately at the same height and are spaced apart along the exposed sides of the vessel 302 that are not in abutment with the acoustic chambers 311, 351, as best seen in FIGS. 3B and 3C.

Finally, in the region just above the upper bundles 328U, 368U is a dense bed region 344, which extends to the top dense bed line 346. A freeboard region 348 occupies the topmost portion of the reformer vessel 302. Product gas 349 exits from the topboard region 348 via cyclones and other equipment (not shown) known to those skilled in the art.

In the embodiment shown, reformer 300 has two heat transfer modules 310, 350, each with an acoustic chamber 311, 351 and an associated pulse combustor 312, 352. During operation, the two heat transfer modules 310, 350 are under computer control to vary the firing rate and heat transfer rate to better match the load in the reformer 300 and enhance reformer turndown.

In the pulse combustors 312 and 352, the combustion stoichiometry may be independently adjusted based on the fuel-firing rate to ensure complete combustion in the tailpipes 314, 354 or acoustic chambers 311, 351. Furthermore, tempering air and/or recycle flue gas may be supplied to the acoustic chambers 311, 351 to regulate the temperature of the gases entering the heat transfer tubes 326, 366 and/or minimize pollutant emissions. Furthermore, the geometry of the pulse combustors 312, 352 with their associated chambers 313, 353, tailpipes 314, 354 and valves 320, 360 can be designed to maximize combustion and acoustic performance while the heat transfer bundle (shield tube diameter and length, outer tube diameter and length and tube-tube spacing or gap in the bundle) can be designed for optimum heat transfer performance and fluid bed operability. In this manner, the pulse combustors may be operated to provide a controlled amount of heat to the heat transfer tubes to process the reactive material introduced into the reformer vessel 302. Persons having ordinary skill in the art of fluid bed operation are familiar with controlling the reformer 300, pulse combustors 312, 352, feedstock, and fluidization medium. Accordingly, through such control, and depending on the material being processed, the reformer 300 may selectively be operated in either the bubbling bed regime or in the turbulent fluidization regime.

Figure 4A:
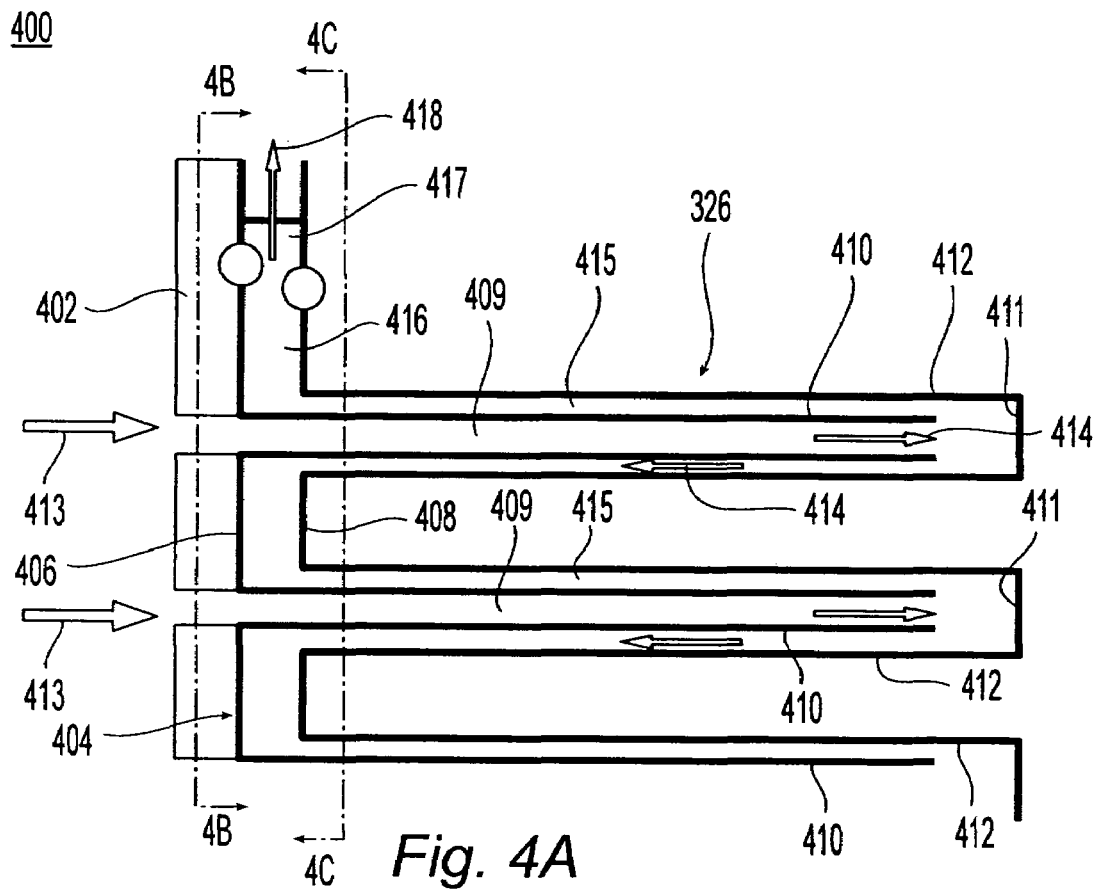
FIG. 4A shows a cutaway partial cross-sectional view of a first embodiment of the wall of the reformer vessel.

FIG. 4A shows a cutaway view of a first embodiment of a first wall section 400 belonging to a wall 332 between the first acoustic chamber 311 and the reformer vessel 302. The first wall section 400 comprises a tube sheet 406, which may itself comprise a refractory-type material 402 facing the first acoustic chamber 311. In this embodiment, the wall section 400 comprises a pair of tube sheets 406, 408 which together form an annular membrane wall 404 interrupted by inwardly protruding heat transfer tubes.

Each heat transfer tube 326, 328 has an annular design, and comprises an inner shield tube 410 and a slightly longer outer tube 412 ("fluid bed heat transfer tube") defining an annulus therebetween. The inner tube sheet 406 (which actually is the outermost tube sheet, relative to the reformer vessel 302) supports the inner shield tubes 410 belonging to a bundle. Meanwhile the outer tube sheet 408 (which actually is the innermost tube sheet, relative to the reformer vessel 302) supports the outer tubes 412 belonging to a bundle. In one embodiment, the outer tube sheet 408 is either welded to the vessel wall 332 at predetermined locations, or bolted thereto through a flange connection. Similarly, the inner tube sheet 406 is also flanged and bolted to a decoupler portion adjacent to the vessel wall 332.

The combustion products, such as flue gas emitted from a tailpipe, flow from the acoustic chamber into the inner shield tube 410, as depicted by arrows 413. The flue gas first travels in a direction away from the wall 332, along a first channel 409 comprising the hollow center of the inner shield tube 410 and towards the end wall 411 of the heat transfer tube. The flue gas then turns around, and flows in a direction towards the wall 332 through a second channel 415 defined by an annulus formed between the inner and other shield tubes 410, 412, as indicated by arrow 414. The second channel 415 is in fluid communication with a manifold 416 formed between two tube sheets 406, 408. Therefore, from the second channel 415, the flue gas enters the manifold 416, from whence it is directed towards a flue gas duct 417, as indicated by arrow 418.

As they travel down the inner shield tube 410, the flue gases therein warm the gases going in the opposite direction within the annular region between inner and outer shield tubes 410, 412, respectively. The flue gases in the annulus tend to cool down as they flow from the inlet of the annulus due to heat transfer to the fluid bed, but are somewhat reheated by heat transfer from the flue gases in the inner shield tube 410.

This arrangement may eliminate the need for thermal expansion joints within the reformer vessel and the associated capital, operating and maintenance costs. Furthermore, the shield tube-annulus design promotes near uniform gas temperature on the outer surface of the outer tube 412, thus reducing the potential for local hot spots on the outer tube 412. It also helps enhance heat transfer to the fluid bed within the reformer vessel. In one embodiment, the cross-section and length of the tubes 410 and 412 are selected such that the heat transfer bundle and the corresponding portion of the acoustic chamber operate as a Helmholtz and/or a quarter wave resonator.

Figure 4B:
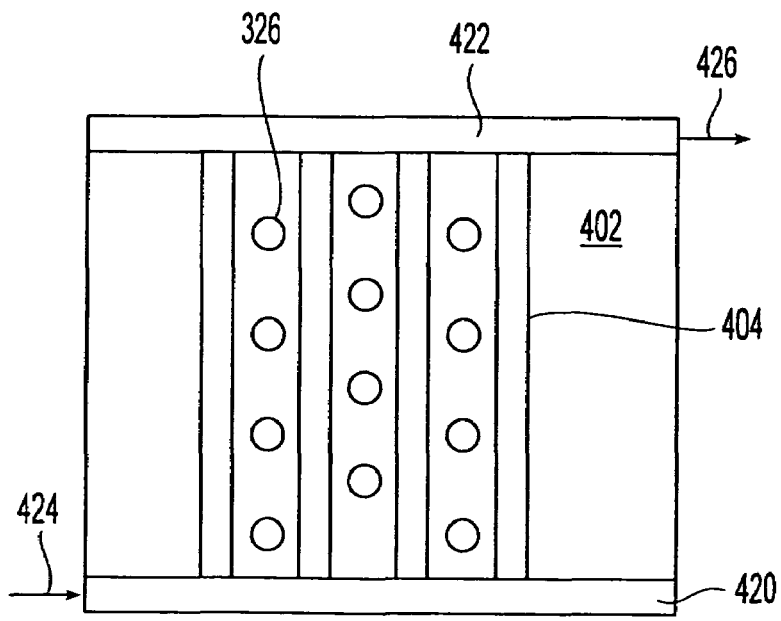
FIG. 4B shows a cross-section of FIG. 4A along lines 4B-4B.
Figure 4C:
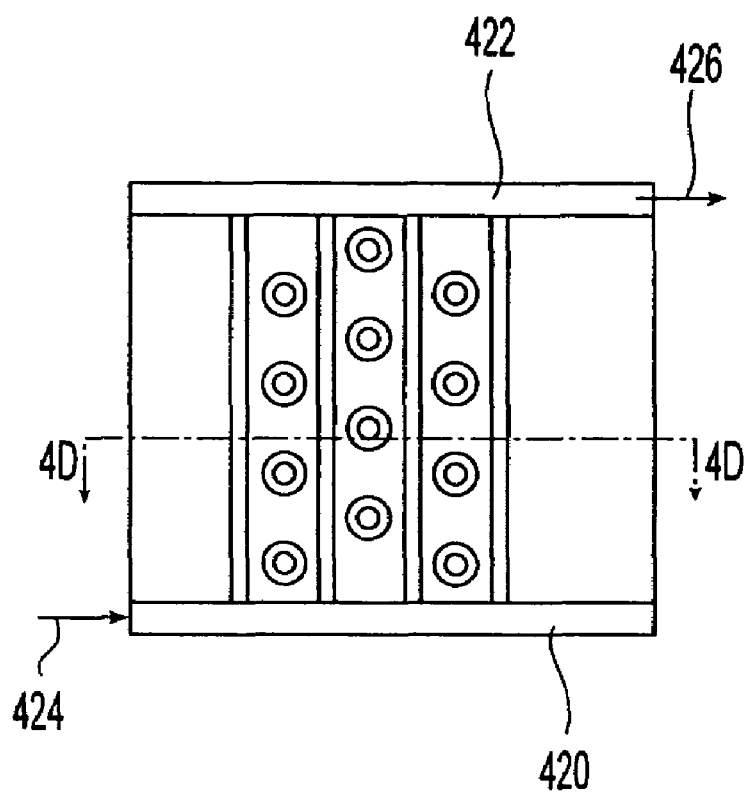
FIG. 4C shows a cross-section of FIG. 4A along lines 4C-4C.
Figure 4D:
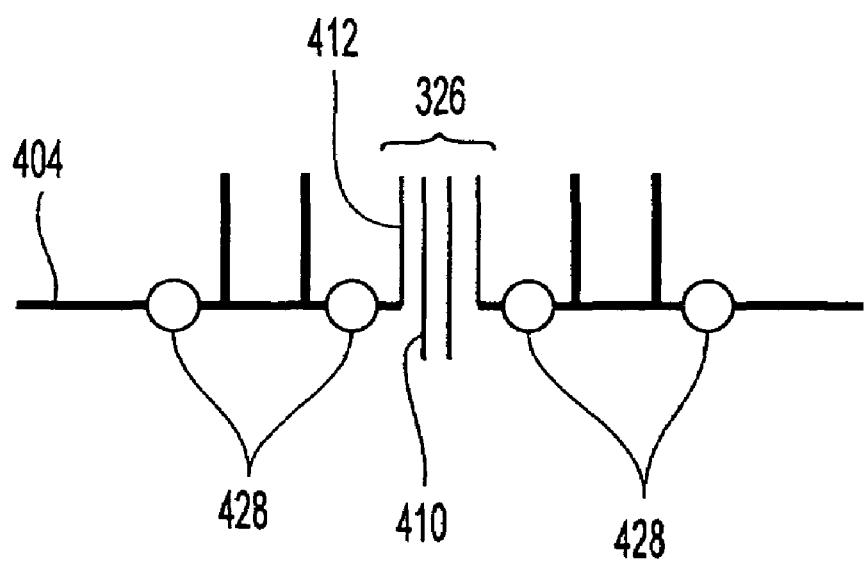
FIG. 4D shows a cross-section of FIG. 4C along lines 4D-4D.

As seen in FIGS. 4B, 4C & 4D, the tube sheets 406, 408 may be water-cooled, employing a membrane wall construction. The outer tube sheet 406 supports an inlet header 420A that is vertically spaced apart from an outlet header 422A. Water 424A is pumped into the inlet header 420A, travels upward through a plurality of cooling tubes 404 and enters the outlet header 422A. A water/steam mixture 426A then exits from this outlet header 422A. Similarly, the inner tube sheet 408 supports an inlet header 420B that is vertically spaced apart from an outlet header 422B. Water 424B is pumped into the inlet header 420B, travels upward through a plurality of cooling tubes 428 and enters the outlet header 422B. A water/steam mixture 426B then exits from this outlet header 422B.

It is understood that, in some embodiments, at least two such wall sections 400 would be provided for acoustic chamber 311, one associated with the lower set of heat transfer tubes, and another associated with the upper set of heat transfer tubes. It is further understood that in a reformer 300 of the sort seen in FIG. 3, each acoustic chamber 311, 351, would have two such wall sections associated therewith, two associated with wall 332 and two others associated with wall 334, for a total of four such wall sections in all.

It is further understood that wall 334 has a similar wall section and so both heat transfer modules 310, 350 pass their flue gases on to the common reformer vessel.

Figure 5A:
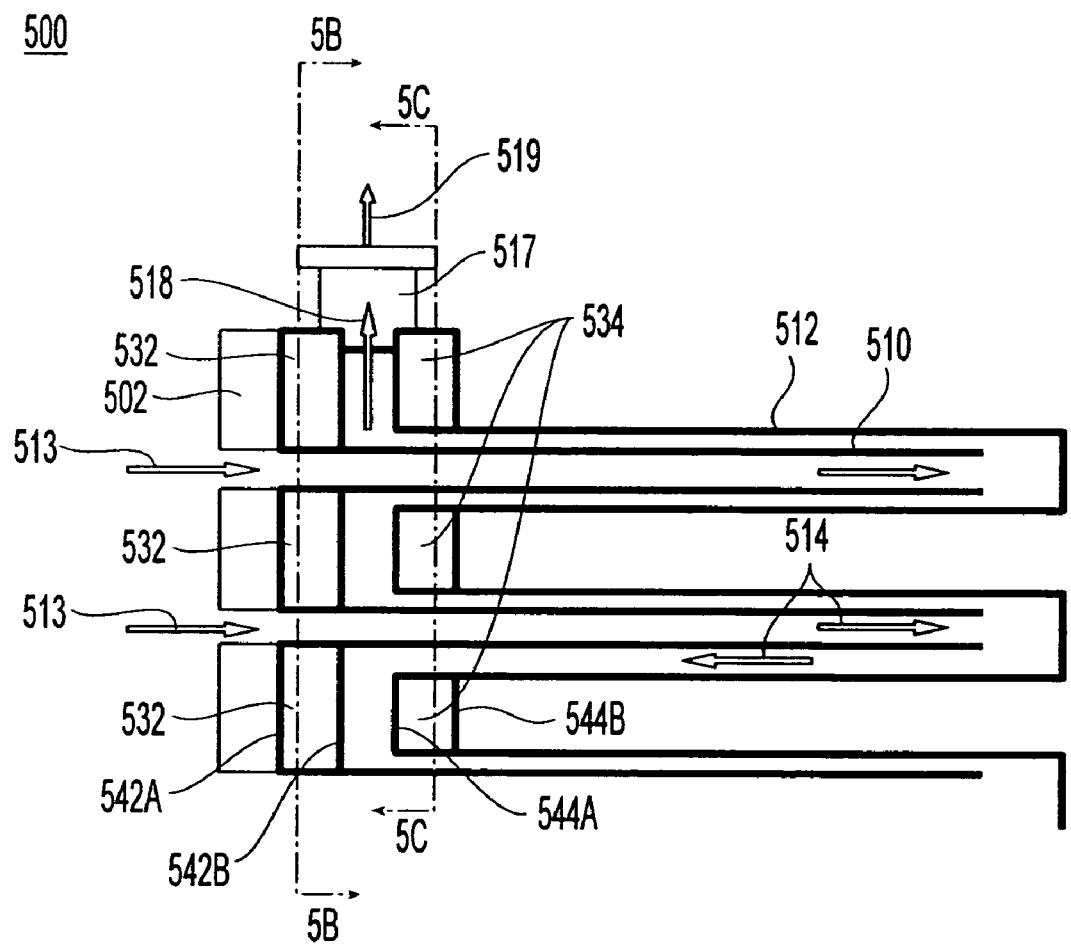
FIG. 5A shows a cutaway partial cross-sectional view of a second embodiment of the wall of the reformer vessel.

FIG. 5A shows a cutaway view of a second embodiment of a wall section 500 belonging to a wall 332 between the first acoustic chamber 311 and the reformer vessel 302. The wall section 500 comprises a first water jacket 532, which may comprise a refractory-type material 502, facing the acoustic chamber. Each of the heat transfer tubes comprises an inner shield tube 510 and a slightly longer outer tube 512 defining an annulus therebetween.

Figure 5B:
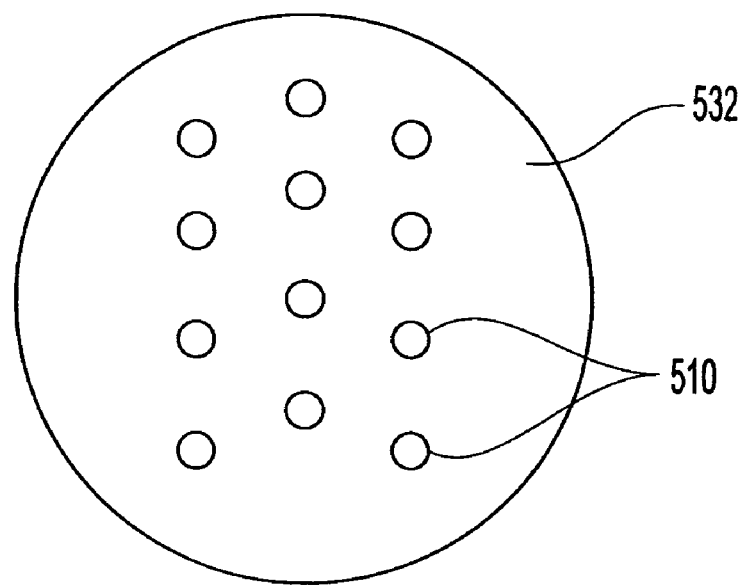
FIG. 5B shows a cross-section of FIG. 5A along lines 5B-SB.
Figure 5C:
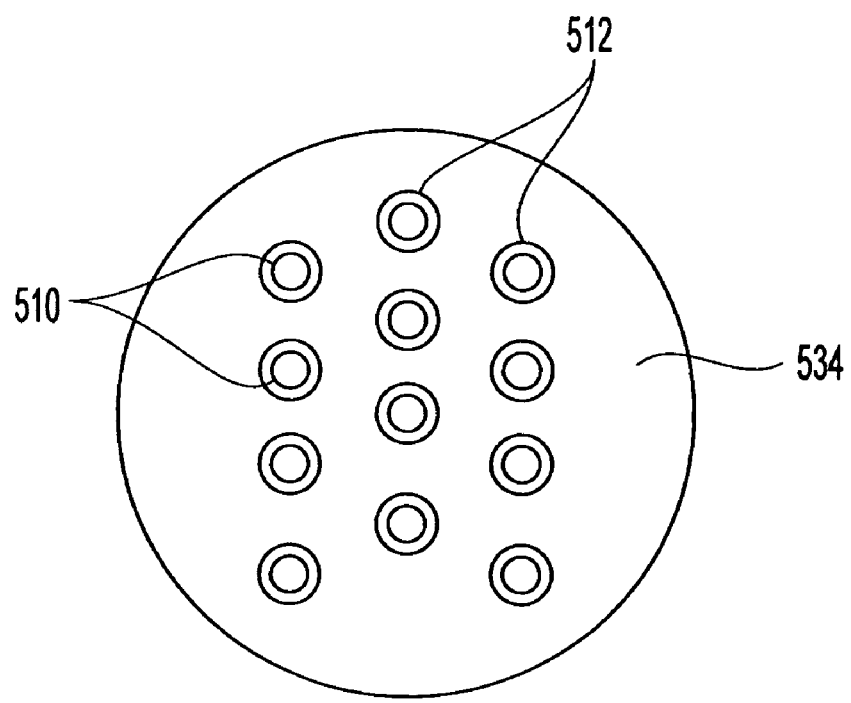
FIG. 5C shows a cross-section of FIG. 5A along lines 5C-5C.

In this embodiment, a pair of water jackets 532, 534 surround the heat transfer tubes. First water jacket 532 is formed from a first pair of tube sheets 542A, 542B, while second water jacket 534 is formed from a second pair of tube sheets 544A, 544B. The inner shield tube water jacket 532 cools the inner shield tubes 510 of the bundle, while the outer tube water jacket 534 cools the outer tubes 512 of the bundle. As seen in the embodiment of FIGS. 5B and 5C, the water jackets 532, 534 may have a circular face when viewed from the reformer vessel. The water jackets may instead have a rectangular face if the steam pressure is relatively low, or if their periphery can be reinforced adequately to comply with the pressure requirements of the reformer vessel.

In the embodiment of FIG. 5A, the combustion products, such as flue gas emitted from a tailpipe, flow from the acoustic chamber into the inner shield tube 510, as depicted by arrows 513. The flue gas travels along the inner shield tube 510 to its end, turns around, and flows through the outer annulus, as indicated by arrow 514. The flue gas then enters a manifold 516 formed between the two water jackets 532, 534. From the manifold, the flue gas is directed towards a flue gas duct 517 as indicated by arrow 518, and from there exits the reformer vessel, as indicated by arrow 519.

In the foregoing sketches, pulse combustors 312, 352 are shown with single valves 320, 360, respectively, and single tailpipes 314, 354, respectively. It is understood, however, that the pulse combustors 312, 352 may each comprise a plurality of such valves and/or a plurality of tailpipes, as necessary.

The reformer may be configured to operate in a turbulent fluidization regime, and the fluidization medium may consist of one from the group of steam, air, enriched air, oxygen, nitrogen, carbon dioxide, recycle product gas, and mixtures thereof.

In addition, while the above description is framed in the context of energy conversion and syngas production, it should be noted that the disclosed reactor 300 may also be gainfully employed for processing any reactive material using thermochemical and/or biochemical approaches. Reactive materials that are contemplated here include not only carbonaceous materials, but also inorganics, among others. It is understood that persons having ordinary skill in the art of fluid bed operation are familiar with controlling the reactor, pulse combustors, feedstock inlets and fluidization medium to thermochemically or biochemically process a whole host of different reactive materials.

The above description of various embodiments of the invention is intended to describe and illustrate various aspects of the invention, and is not intended to limit the invention thereto. Persons of ordinary skill in the art will understand that certain modifications may be made to the described embodiments without departing from the invention. All such modifications are intended to be within the scope of the appended claims.

What is claimed is:

1. A fluid bed reformer configured to convert a carbonaceous material into a product gas, the reformer comprising:
a reaction vessel defining a compartment configured to receive fluidizable carbonaceous material, the reaction vessel having at least a first wall portion and a second wall portion;
a first heat transfer module connected to the reaction vessel, the first heat transfer module comprising a first pulse combustor connected to a first acoustic chamber having a first end and a second end, wherein the first pulse combustor comprises at least one first tailpipe that terminates in the first acoustic chamber between the first and second ends; and
a first plurality of heat transfer tubes protruding into said compartment, each of said first plurality of heat transfer tubes being in fluid communication with the acoustic chamber through said first wall portion, wherein:
each of said first plurality of heat transfer tubes is configured such that combustion products emitted from said at least one first tailpipe travel along a first channel of each heat transfer tube in a direction away from said first wall portion, and then along a second channel of said each heat transfer tube in a direction towards the first wall portion; and
the at least one tailpipe comprises a resonator tube of the first pulse combustor and does not protrude into the compartment of the reaction vessel.

2. The fluid bed reformer according to claim 1, wherein:
each of said first plurality of heat transfer tubes comprises an inner shield tube and an outer tube;
the inner shield tube forms the first channel; and
an annulus formed between the inner shield tube and the outer tube forms the second channel.

3. The fluid bed reformer according to claim 2, further comprising a manifold in fluid communication with the second channel.

4. The fluid bed reformer according to claim 3, wherein the manifold is formed between a first tube sheet associated with the inner shield tube, and a second tube sheet associated with the outer tube.

5. The fluid bed reformer according to claim 4, wherein each of first and second tube sheets is either welded or bolted to the first wall portion.

6. The fluid bed reformer according to claim 1, further comprising a cooling system associated with the first plurality of heat transfer tubes, said cooling system comprising an inlet header vertically spaced apart from an outlet header, and a plurality of cooling tubes between the inlet header and the outlet header.

7. The fluid bed reformer according to claim 1, further comprising a cooling system associated with the first plurality of heat transfer tubes, said cooling system comprising a pair of jackets spaced apart from one another, a first jacket cooling inner tubes of the first plurality of heat transfer tubes, and a second jacket cooling outer tubes of the first plurality of heat transfer tubes.

8. The fluid bed reformer according to claim 1, further comprising:
a second plurality of heat transfer tubes protruding into said compartment, each of said second plurality of heat transfer tubes also being in fluid communication with the first acoustic chamber, the second plurality of heat transfer tubes being vertically spaced apart from said first plurality of heat transfer tubes, wherein:
each of said second plurality of heat transfer tubes is configured such that combustion products emitted from the tailpipe travel along a first channel of each heat transfer tube in a direction away from said first wall portion, and then along a second channel of said each heat transfer tube in a direction towards the first wall portion.

9. The fluid bed reformer according to claim 8, further comprising at least one feedstock inlet in fluid communication with said compartment, said at least one feedstock inlet terminating in a region vertically between the first and second plurality of heat transfer tubes.

10. The fluid bed reformer according to claim 8, further comprising:
a second heat transfer module connected to the reaction vessel, the second heat transfer module comprising a second pulse combustor connected to a second acoustic chamber, wherein the second pulse combustor comprises a second tailpipe that terminates in the second acoustic chamber, and
a third plurality of heat transfer tubes protruding into said compartment, each of said third plurality of heat transfer tubes being in fluid communication with the second acoustic chamber through the second wall portion, wherein:
each of said third plurality of heat transfer tubes is configured such that combustion products emitted from said second tailpipe travel along a first channel of each of said third plurality of heat transfer tubes in a direction away from a second wall portion, and then along a second channel of each of said third plurality of heat transfer tubes in a direction towards the second wall portion.

11. The fluid bed reformer according to claim 10, further comprising:
a fourth plurality of heat transfer tubes protruding into said compartment, each of said fourth plurality of heat transfer tubes also being in fluid communication with the second acoustic chamber, the fourth plurality of heat transfer tubes being vertically spaced apart from said third plurality of heat transfer tubes, wherein:
each of said fourth plurality of heat transfer tubes is configured such that combustion products emitted from the second tailpipe travel along a first channel of each of said fourth plurality of heat transfer tubes in a direction away from said second wall portion, and then along a second channel of each of said fourth plurality of heat transfer tubes in a direction towards the second wall portion.

12. The fluid bed reformer according to claim 11, further comprising at least one feedstock inlet in fluid communication with said compartment, said at least one feedstock inlet terminating in a region vertically between the first and second plurality of heat transfer tubes, and also between the third and fourth plurality of heat transfer tubes.

13. The fluid bed reformer according to claim 1, comprising:
a plurality of heat transfer modules connected to the reaction vessel, each heat transfer module comprising a pulse combustor connected to an associated acoustic chamber, wherein each pulse combustor comprises at least one tailpipe that terminates in the associated acoustic chamber, and
a plurality of upper and lower heat transfer tubes protruding into said compartment, each of said plurality of upper and lower heat transfer tubes being in fluid communication with the associated acoustic chamber through a wall portion of reaction vessel, wherein:
each of said plurality of upper and lower heat transfer tubes is configured such that combustion products emitted from said at least one tailpipe travel along a first channel of each heat transfer tube in a direction away from the wall portion of the reaction vessel, and then along a second channel of said each heat transfer tube in a direction towards the wall portion.

14. A fluid bed reactor configured to thermo chemically or biochemically process a reactive material, the reactor comprising:
a reaction vessel defining a compartment suitable for receiving a reactive material;
a plurality of heat transfer modules connected to the reaction vessel, each heat transfer module comprising a pulse combustor connected to an associated acoustic chamber having a first end and a second end, wherein each pulse combustor comprises at least one tailpipe that terminates in the associated acoustic chamber between the first and second ends, and
a plurality of upper and lower heat transfer tubes protruding into said compartment, each of said plurality of upper and lower heat transfer tubes being in fluid communication with the associated acoustic chamber through a wall portion of reaction vessel, wherein:
each of said plurality of upper and lower heat transfer tubes is configured such that combustion products emitted from said at least one tailpipe travel along a first channel of each heat transfer tube in a direction away from the wall portion of the reaction vessel, and then along a second channel of said each heat transfer tube in a direction towards the wall portion;

the at least one tailpipe comprises a resonator tube of the first pulse combustor and does not protrude into the compartment of the reaction vessel.

15. The fluid bed reactor according to claim 14, wherein:
each heat transfer tube comprises an inner shield tube and an outer tube;
the inner shield tube forms the first channel; and
an annulus formed between the inner shield tube and the outer tube forms the second channel.

16. The fluid bed reactor according to claim 15, further comprising a manifold in fluid communication with the second channel.

17. The fluid bed reactor according to claim 16, wherein the manifold is formed between a first tube sheet associated with the inner shield tube, and a second tube sheet associated with the outer tube.

18. The fluid bed reactor according to claim 17, wherein each of first and second tube sheets is either welded or bolted to the wall portion of the reaction vessel.

19. The fluid bed reactor according to claim 14, further comprising a cooling system associated with at least one of the upper and lower heat transfer tubes, said cooling system comprising an inlet header vertically spaced apart from an outlet header, and a plurality of cooling tubes between the inlet header and the outlet header.

20. The fluid bed reactor according to claim 14, further comprising a cooling system associated with the first plurality of heat transfer tubes, said cooling system comprising a pair of jackets spaced apart from one another, a first jacket cooling inner tubes of the first plurality of heat transfer tubes, and a second jacket cooling outer tubes of the first plurality of heat transfer tubes.

21. The fluid bed reactor according to claim 14, further comprising at least one feedstock inlet in fluid communication with said compartment, said at least one feedstock inlet terminating in a region vertically between the plurality of upper and lower heat transfer tubes.

22. The fluid bed reactor according to claim 1, wherein:
the at least one first tailpipe terminates about half-way along the vertical extent of the acoustic chamber, between the first and second ends.

23. The fluid bed reactor according to claim 22, wherein, upon activation of the first pulse combustor, the first acoustic chamber resonates and a standing wave is created therein with pressure anti-nodes formed at said first and second ends.

24. The fluid bed reactor according to claim 14, wherein:
the at least one first tailpipe terminates about half-way along the vertical extent of the acoustic chamber, between the first and second ends.

25. The fluid bed reactor according to claim 24, wherein, upon activation of the first pulse combustor, the first acoustic chamber resonates and a standing wave is created therein with pressure anti-nodes formed at said first and second ends.

* * * * *